US012663559B2

(12) United States Patent
Ziad

(10) Patent No.: US 12,663,559 B2
(45) Date of Patent: Jun. 23, 2026

(54) METHOD AND DEVICE FOR EVALUATING PARAMETERS CHARACTERIZING ATMOSPHERIC TURBULENCE

(71) Applicants: CENTRE NATIONAL DE LA RECHERCHE SCIENTIFIQUE, Paris (FR); Université Côte d'Azur, Nice (FR); OBSERVATOIRE DE LA CÔTE D'AZUR, Nice (FR)

(72) Inventor: Aziz Ziad, Falicon (FR)

(73) Assignees: CENTRE NATIONAL DE LA RECHERCHE SCIENTIFIQUE, Paris (FR); Université Côte d'Azur, Nice (FR); Observatoire de la Côte d'Azur, Nice (FR)

( * ) Notice: Subject to any disclaimer, the term of this patent is extended or adjusted under 35 U.S.C. 154(b) by 239 days.

(21) Appl. No.: 17/797,734

(22) PCT Filed: Feb. 25, 2021

(86) PCT No.: PCT/EP2021/054719
§ 371 (c)(1),
(2) Date: Aug. 5, 2022

(87) PCT Pub. No.: WO2021/170737
PCT Pub. Date: Sep. 2, 2021

(65) Prior Publication Data
US 2023/0072720 A1 Mar. 9, 2023

(30) Foreign Application Priority Data
Feb. 26, 2020 (EP) .................................... 20159537

(51) Int. Cl.
*G01W 1/10* (2006.01)
*G02B 23/16* (2006.01)
(Continued)

(52) U.S. Cl.
CPC .............. *G01W 1/10* (2013.01); *G02B 23/16* (2013.01); *G06T 7/0002* (2013.01);
(Continued)

(58) Field of Classification Search
CPC .. G01W 1/10; G01W 2001/003; G02B 23/16; G06T 7/0002; G06T 2207/30168; G06T 2207/30192
See application file for complete search history.

(56) References Cited

U.S. PATENT DOCUMENTS 5,343,287 A 8/1994 Wilkins
6,496,252 B1 * 12/2002 Whiteley ............... G01N 21/41
73/147

(Continued)

OTHER PUBLICATIONS

Day time Spatio-temporal turbulence characterization (Year: 2016).*
Ikhlef et al. "Misolfa: a generalized monitor for daytime spatio-temporal turbulence characterization" Monthly notices of the Royal Astronomical Society, 517-530 (Year: 2016).*
(Continued)

*Primary Examiner* — Catherine T. Rastovski
*Assistant Examiner* — Sharad Timilsina
(74) *Attorney, Agent, or Firm* — Maier & Maier, PLLC

(57) ABSTRACT

A method for characterizing the atmospheric turbulence, includes acquiring images of a celestial object by means of a camera coupled to a small telescope; analyzing the acquired images to determine angle of arrival fluctuations of wavefronts from positions of spots formed by the celestial object in the acquired images; determining variances of the angle of arrival fluctuations; and estimating the Fried parameter from the variances of the angle of arrival fluctuations, by setting an outer scale parameter of the atmospheric turbulence to a fixed median value.

15 Claims, 6 Drawing Sheets

(51) Int. Cl.
    *G06T 7/00*          (2017.01)
    *G01W 1/00*        (2006.01)

(52) U.S. Cl.
    CPC ................. *G01W 2001/003* (2013.01); *G06T 2207/30168* (2013.01); *G06T 2207/30192* (2013.01)

(56) References Cited

U.S. PATENT DOCUMENTS

2005/0151961 A1 *   7/2005   McGraw ................... G01J 1/42
                                        356/121
2018/0324359 A1 *  11/2018   Pan ........................ H04N 23/80

OTHER PUBLICATIONS

Ikhlef, et al., "Misolfa: a generalized monitor for daytime spatio-temporal turbulence characterization", Monthly Notices of the Royal Astronomical Society, vol. 458, Issue 1, pp. 517-530, 2016.

Ziad, et al., "Experimental estimation of the spatial-coherence outer scale from a wavefront statistical analysis", Astronomy & Astrophysics, 282, pp. 1021-1033, 1994.

Ziad, et al., "Temporal characterization of atmospheric turbulence with the GSM instrument", Journal of Optics: Pure & Applied Optics, 14, 2012.

Aristidi, et al., "A Generalized Differential Image Motion Monitor", Monthly Notices of the Royal Astronomical Society, vol. 486, Issue 1, pp. 915-925, 2019.

Bentahar, et al., "The effects that conduct the degradation of the solar edge images", Journal of Optics, vol. 46, No. 4, pp. 465-478, 2017.

\* cited by examiner

METHOD AND DEVICE FOR EVALUATING PARAMETERS CHARACTERIZING ATMOSPHERIC TURBULENCE

CROSS-REFERENCE TO RELATED APPLICATIONS

This application is a National Stage of International patent application PCT/EP2021/054719, filed on Feb. 25, 2021, which claims priority to foreign European patent application No. EP 20159537.8, filed on Feb. 26, 2020, the disclosures of which are incorporated by reference in their entirety.

TECHNICAL FIELD

The present invention relates to a method and device for evaluating parameters characterizing atmospheric turbulence. The present invention applies to qualification of locations for the deployment of astronomical observatories or ground stations for optical communications. The parameters characterizing atmospheric turbulence can also be used to refine models of the atmospheric turbulence prediction.

BACKGROUND

Atmospheric turbulence is responsible for the degradation of astronomical images observed through the atmosphere. Stars in outer space viewed through ground-based telescopes appear blurry and twinkling, due to fluctuations in the refractive index of Earth's atmosphere. Atmospheric turbulence also strongly disturbs optical communications using a laser beam, especially between a ground station and a communication satellite.

The fluctuations in the refractive index of the atmosphere involve many factors including wind velocity, temperature gradients, and elevation. The dominant factor is usually temperature variation. Light in a narrow spectral band approaching the atmosphere from a distant light source, such as a star, can be modelled by a plane wave. The planar nature of the wave remains unchanged as long as the wave propagates through free space, which has a uniform index of refraction. The atmosphere, however, contains a multitude of randomly distributed regions of index of refraction that varies from a region to another. As a result, the light wave that reaches the surface of the Earth is not planar.

Since the early 70's, many techniques have been developed to achieve diffraction limited resolution of observing instruments, namely speckle interferometry, long baseline interferometry and adaptive optics. Performances of these techniques rely on a good knowledge of atmospheric turbulence parameters, i.e. the Fried parameter, the seeing, the isoplanatic angle, the coherence time and the outer scale. The Fried parameter is defined as the diameter of a circular area over which the RMS (Root Mean Square) wave front aberration due to passage through the atmosphere is less than 1 radian. The seeing is roughly the full width at half maximum (FWHM) of the point spread function when imaging a star through the atmosphere of Earth. The isoplanatic angle corresponds to the angular coherence field of view. The coherence time corresponds to the time over which the changes in the turbulence become significant or have significant effects in the observed field. In the turbulence theory, the outer scale defines the largest size of eddies in the atmosphere and it corresponds to the largest distance over which the wavefront is completely uncorrelated.

Several techniques and instrumentation were developed for measuring the optical turbulence of the atmosphere. The Generalized Seeing Monitor (GSM) was a reference for monitoring the coherence parameters of the wave front at ground level. The GSM comprises four identical modules pointed at a same star and controlled by a single computer. Each module measures the atmospheric angle-of-arrival (AA) fluctuations at selected positions on the wave front. The image of the observed star is formed upon a Ronchi grating shifted by a galvanometric mirror manipulated by a 200-Hz triangular signal. The flux transmitted through the grating is detected by a photomultiplier working in the photon-counting mode.

The Generalized Differential Image Motion Monitor (GDIMM) comprises a telescope having a diameter of 28 cm, with three circular apertures of different diameters that observes a bright star. Two apertures are equipped with a glass prism oriented to give opposite tilts to the incident light. The third aperture has a central obstruction and is designed to estimate the isoplanatic angle. The three apertures are coupled to a camera having a frame rate of about 100 frames per second to properly sample the temporal variability of angle of arrival fluctuations and to estimate the coherence time.

All these instruments are relatively complex, costly and bulky. Therefore they are not well suited for prospecting for new astronomical observation sites or optical communication ground station sites, or for being widely used notably to fine tune the forecast models of the atmospheric turbulence.

Accordingly, there is a need for a lightweight and simple instrumentation enabling evaluation of parameters characterizing the atmospheric turbulence. There is also a need for accurately evaluating and monitoring such parameters by means of a lightweight and simple instrumentation.

SUMMARY

A method is described for estimating parameters characterizing the atmospheric turbulence. The method may comprise: acquiring images of a celestial object by means of a camera coupled to a telescope; analyzing the acquired images to determine angle of arrival fluctuations of wavefronts from positions of at least one spot formed by the celestial object in the acquired images; determining variances of the angle of arrival fluctuations; and estimating the Fried parameter from the variances of the angle of arrival fluctuations, by setting an outer scale parameter of the atmospheric turbulence to a fixed median value, wherein the at least one spot is formed by the Polar star to which the telescope is rigidly pointed, or the at least one spot comprises two spots spaced apart from each other in each acquired image.

Thus when the Polar star is visible, the telescope can be rigidly pointed to the Polar star to avoid instrumental vibrations. In the case of absence of the Polar star or during daytime, an extended celestial object such as the Moon or the Sun limb is observed to exploit two distant spots of the celestial object by means of a differential method avoiding instrumental vibrations.

According to an embodiment, the outer scale parameter is set to 20 m plus or minus 10%.

According to an embodiment, the telescope is rigidly secured to a fixed support in a direction towards the Polar star, to avoid instrumental vibrations.

According to an embodiment, the Fried parameter is estimated from the following equation:

$$\sigma^2 = 0.18\lambda^2 r_0^{-5/3}\left(D^{-1/3} - 1.525 L_0^{-1/3}\right)$$

wherein $\sigma^2$ is the variance of the angle of arrival fluctuations, $\lambda$ is the wavelength of the light emitted by the observed star, $r_0$ is the Fried parameter, D is an aperture diameter of the telescope, and $L_0$ is the outer scale parameter.

According to an embodiment, the telescope is fixed on a mount and oriented towards the Moon or Sun limb, the mount being motorized and controlled to compensate the Earth rotation about its rotation axis, the acquired images being analyzed to determine the angle of arrival fluctuations of light from positions of two spots spaced apart from each other on the Moon or Sun limb to avoid instrumental vibrations.

According to an embodiment, the Fried parameter is estimated from the following equation:

$$D_{\alpha,s}(\theta\overline{h}) = 0.364\lambda^2 r_0^{-5/3} D^{-1/3}\left[1 - 0.798\left(\frac{\theta\overline{h}}{D}\right)^{-1/3}\right]$$

wherein $\overline{h}$ is the equivalent altitude of the whole atmospheric turbulence, $\lambda$ is the wavelength of the light emitted by the observed limb, $r_0$ is the Fried parameter, D is an aperture diameter of the telescope, $\theta$ is an angular separation between two viewing angles $\theta_1$ and $\theta_2$ of considered points of the observed limb, $\alpha(\theta_1)$ and $\alpha(\theta_2)$ are angle of arrival fluctuations at the two considered points, and $D_{\alpha,s}(\theta\overline{h})$ is a spatial structure function of angle of arrival fluctuations $\alpha$ for the angular separation $\theta$.

According to an embodiment, the equivalent altitude of the whole atmospheric turbulence is deduced from the following equation:

$$\frac{D_{\alpha,s}(\theta_a\overline{h})}{D_{\alpha,s}(\theta_b\overline{h})} \simeq \frac{D^{-1/3} - 0.798(\theta_a\overline{h})^{-1/3}}{D^{-1/3} - 0.798(\theta_b\overline{h})^{-1/3}}$$

wherein $\theta_a$ and $\theta_b$ are angular separations of two considered pairs of points on the observed limb, and $D_{\alpha,s}(\theta_a\overline{h})$ and $D_{\alpha,s}(\theta_b\overline{h})$ are values of the spatial structure function of angle of arrival fluctuations for the two angular separations $\theta_a$ and $\theta_b$.

According to an embodiment, the acquired images are analyzed in a limited region around analyzed points formed by the celestial object.

According to an embodiment, the variance of the angle of arrival fluctuations is multiplied by $\cos(z)$, z being an angle between the direction of the observed star and the zenithal direction, at an observation site where the images are acquired.

According to an embodiment, the images are acquired by the camera at an image rate of 50 to 200 images/s.

Embodiments may also relate to a device configured to implement the above-disclosed method, to analyze images acquired by a camera coupled to a telescope pointed at a celestial object.

According to an embodiment, the device comprises a camera coupled to a telescope, and a processing card receiving and processing images acquired by the camera.

According to an embodiment, the telescope has at least one of the following features: it has an aperture diameter set to a value between 4 and 12 cm, it comprises a Barlow lens interfacing with the camera to increase the focal length of the telescope, and it is of the type Cassegrain.

Embodiments may also relate to a computer program product loadable into a computer memory and comprising code portions which, when carried out by a computer, configure the computer to carry out the above-disclosed method, to analyze images acquired by a camera coupled to a telescope pointed at a celestial object.

BRIEF DESCRIPTION OF THE DRAWINGS

The method and/or device may be better understood with reference to the following drawings and description. Non-limiting and non-exhaustive descriptions are described with the following drawings. In the figures, like referenced signs may refer to like parts throughout the different figures unless otherwise specified.

DETAILED DESCRIPTION

Figures 1, 2:
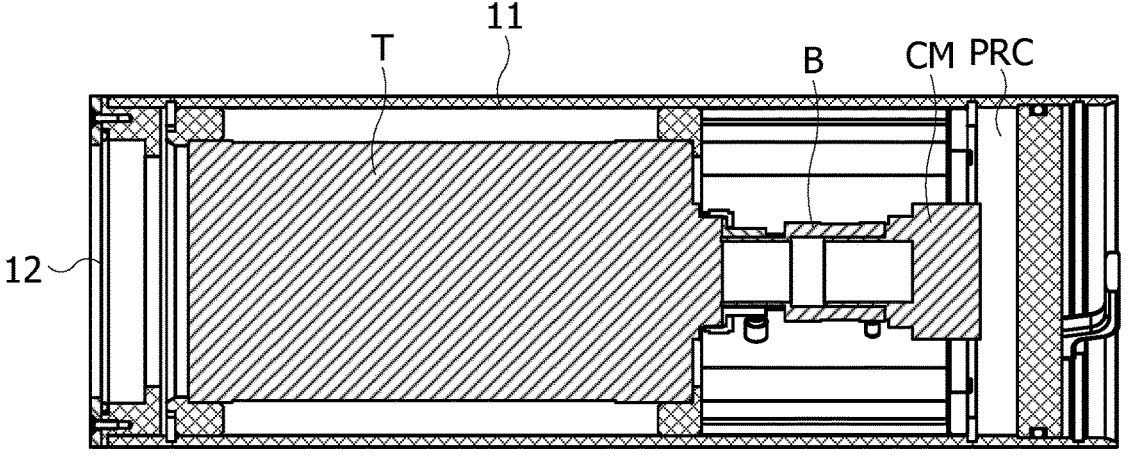
FIG. 1 is a perspective view of a device for estimating parameters of the atmospheric turbulence, according to an embodiment.
FIG. 2 is a sectional view of the device, according to an embodiment.

FIG. 1 illustrates a device for estimating parameters of the atmospheric turbulence, according to an embodiment. The device comprises a fixed support 2 supporting a casing 1 housing a telescope, a camera and a data processing card. The casing 1 comprises a tube 11 preferably sealed in a watertight manner by a transparent window 12. The tube 11 has for example a cylindrical shape.

According to an embodiment, the fixed support 2 comprises a base 21 intended to be rigidly secured to a fixed and rigid location (e.g. a pilar). The support 2 comprises a plate 22 rotatably mounted parallel on the base 21 around an axis perpendicular to the base 21. A mechanism 24 is provided to accurately adjust an azimuth angle of the plate 22 with respect to the base 21 and strongly maintain this angle. The support 2 further comprises a plate 23 extending perpendicularly to the plate 22 and which can be made integral with the plate 22. The tube 11 is rotatably fixed to the plate 23 around an axis perpendicular to the plate 23, by means of screws 25, 26 arranged in slotted holes formed in the plate 23. A rod coupled with an adjustment wheel 27 and having ends respectively fixed to the plate 23 and to the tube 11 is provided to accurately adjust an elevation angle of the tube 11. When the elevation angle is adjusted, the screws 25, 26 are tightened to strongly maintain the elevation angle.

Figure 3:
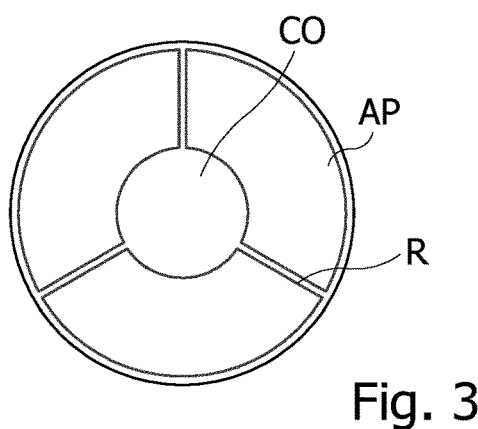
FIG. 3 is a front view of an optical aperture of the device, according to an embodiment.

FIG. 2 shows the interior of the tube 11. The tube 11 houses a telescope T coupled with a digital camera CM connected to a processing card PRC. The processing card PRC can also be integrated into the camera CM. A Barlow lens B can be inserted between the telescope T and the camera CM to extend the focal length of the telescope T in order to increase the sensitivity of the telescope T. The telescope T can be of the type refractive or reflective, with a circular aperture AP having a diameter of about 10 cm (between 8 and 12 cm) and a central obstruction CO having a diameter of about 4 cm (FIG. 3). The obstruction CO can be supported by arms R.

According to another embodiment, no processing card is housed in the tube 11, the camera CM being coupled to a connector to be connected to an external processing device.

According to an embodiment, the telescope T is of the type Cassegrain. The camera CM can be of CCD (Charge-Coupled Device) type.

The support 2 is intended to strongly maintain and point the telescope T at an almost fixed celestial object, i.e. the polar star ($\alpha$ UMi), so as to prevent vibrations due to the wind. In this manner, the telescope T does not need to be motorized to follow the Earth rotation about its polar axis. Thus the vibrations generated by a motorized mount are avoided. The casing is intended to protect the telescope T, the camera CM and the card PRC against the weather.

Figure 4:
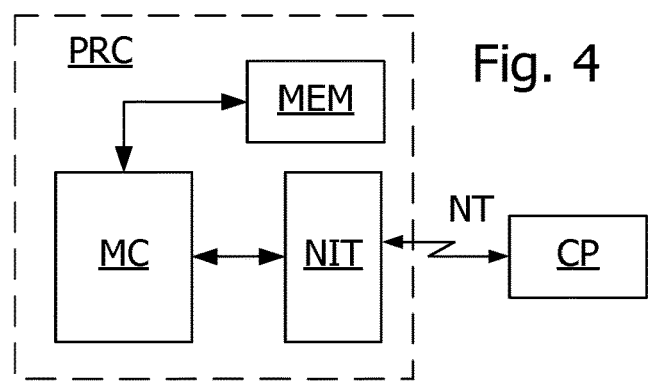
FIG. 4 is a block diagram of a processing card of the device.

FIG. 4 illustrates components of the processing card PRC. The processing card PRC comprises at least one processor MC, and, operatively coupled to the processor, memories MEM, and communication circuits NIT. The memories MEM comprise volatile memories and non-volatile memories. The non-volatile memories store an operating system, applications and all images provided by the camera CM. The communication circuits NIT enables the processor MC to be operatively coupled to an electronic communication network NT, and is configured to transmit the images captured by the camera CM to an external computer CP. For example, when these computer readable program code components are processed by the processor MC, the program code components are configured to cause execution of the method for analysing the images and for computing parameters characterizing the atmospheric turbulence, as described below. In another embodiment, all or a part of these parameters are computed by an external computer CP to which the images captured by the camera CM are sent.

Figure 5:
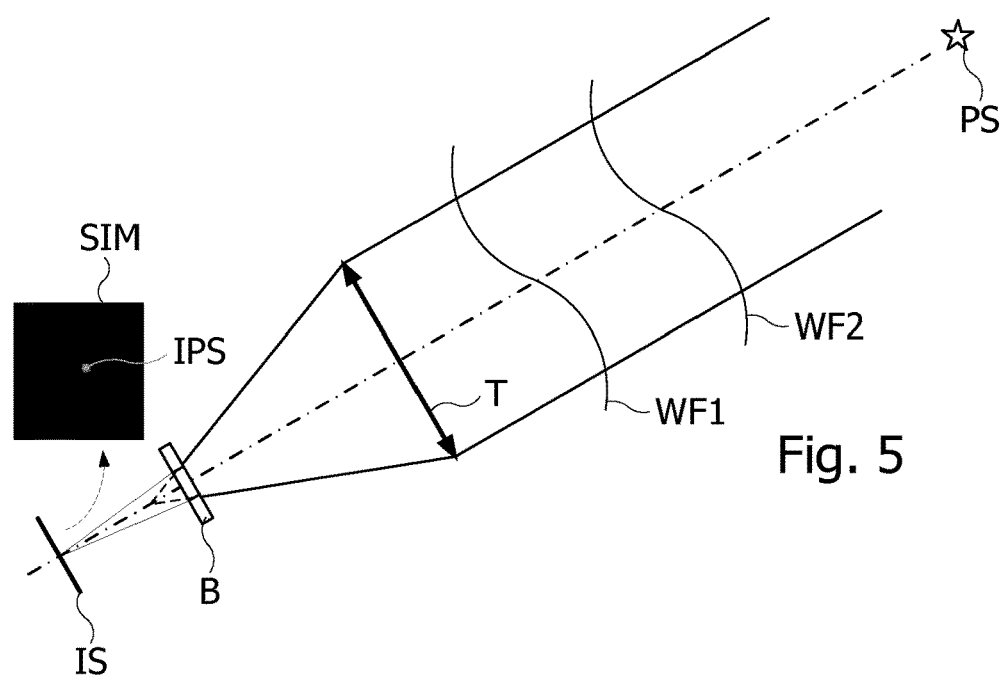
FIG. 5 is a simplified optical scheme of the device, according to an embodiment.

FIG. 5 illustrates the optical path from the observed star PS through the atmosphere, the telescope T, the Barlow lens B, up to an image sensor IS of the camera CM. The light emitted by the observed star PS forms wave fronts WF1, WF2 which are perturbed by different turbulent layers of the atmosphere. FIG. 5 also shows an image SIM of observed star PS formed on the image sensor IS of the camera CM in the focal plane of the telescope T associated with the Barlow lens B.

Figure 6:
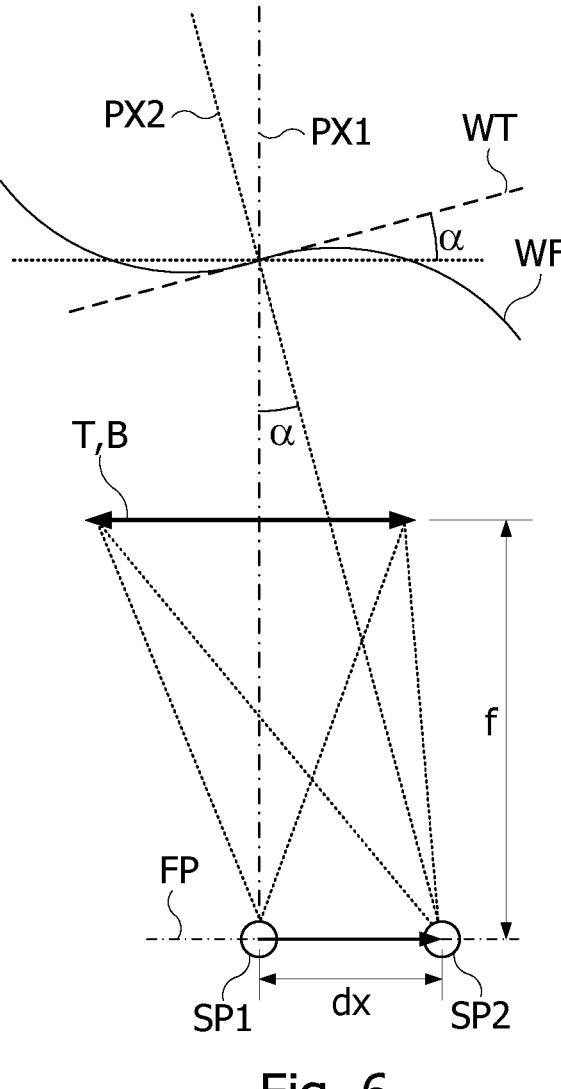
FIG. 6 is a simplified optical scheme showing how angle of arrival fluctuations are measured in the device, according to an embodiment.

The Fried parameter can be estimated to characterize the turbulence of the atmosphere. The Fried parameter is a measure of the quality of optical transmission through the atmosphere due to random inhomogeneities in the atmosphere's refractive index. According to an embodiment, the processing card PRC is configured to analyse the images provided by the camera CM to determine angle of arrival fluctuations of the light emitted by the observed star PS, from a number of images provided by the camera CM. FIG. 6 illustrates a method implemented by the processing card PRC to determine these angle of arrival fluctuations.

The camera CM is configured to provide an image at a rate corresponding to the coherence time of the atmospheric turbulence to distinguish the spots formed by the observed star PS on the image sensor IS. The integration time or image time interval between two images provided by the camera CM can be set to a few ms, between 5 and 20 ms (corresponding to an image rate of 50 to 200 images/s), for example 5 ms (corresponding to an image rate of 200 images/s). FIG. 6 schematically shows the telescope T with its Barlow lens B, a perturbed wave front WF, propagation axes of the light emitted by the observed star, the focal plane FP of the telescope T and the Barlow lens B corresponding to the sensitive surface of the image sensor IS of the camera CM. FIG. 6 also shows two spots SP1, SP2 formed at different moments by the observed star on the image sensor IS disposed in the focal plane FP of the telescope T, the two spots being spaced by the distance dx due to atmospheric turbulence. The distance dx can be determined by measuring the distance between the positions of the spots SP1 and SP2, the position of each spot being determined by a barycentric method. The distance dx corresponds to an angle of arrival fluctuation $\alpha$, with $\alpha$=dx/f, f being the focal distance of the optical system (telescope T+Barlow lens B). In a direction y perpendicular to the direction x in the focal plane FP, a distance dy corresponds to an angle of arrival fluctuation $\beta$, with $\beta$=dy/f.

The processing card PRC is configured to determine a number of values of the angle of arrival fluctuations $\alpha$ and $\beta$ from a great number of images provided by the camera CM, thus forming time series of angle of arrival fluctuations $\alpha(t)$ and $\beta(t)$ in x and y directions, respectively, and then to compute variances $$\sigma_\alpha^2$$

and $$\sigma_\beta^2$$

or standard deviations $\sigma_\alpha$ and $\sigma_\beta$ of angle of arrival fluctuations.

According to an embodiment, only a limited zone in the images provided by the camera CM is analyzed around the observed star PS, if the observed star is always present in this zone. According to an example, the analyzed zone extends on 50×50 pixels. Thus the images provided at a high rate by the camera CM can be stored and/or analyzed using a conventional processor.

It was demonstrated that the variances $$\sigma_\alpha^2$$

and $$\sigma_\beta^2$$

of the angle of arrival fluctuations in x and y directions can be computed according to the following equations:

$$\sigma_\alpha^2 = 0.18\lambda^2 r_{0x}^{-5/3}\left(D^{-1/3} - 1.525L_0^{-1/3}\right) \qquad (1)$$

$$\sigma_\beta^2 = 0.18\lambda^2 r_{0y}^{-5/3}\left(D^{-1/3} - 1.525L_0^{-1/3}\right) \qquad (2)$$

wherein $\lambda$ is the wavelength of the light emitted by the observed star PS, D is the diameter of the aperture of the telescope T and $L_0$ is the outer scale and $r_{0x}$ and $r_{0y}$ are Fried parameter values in x and y directions, respectively. The Fried parameter $r_0$ is known to vary as a function of the wavelength $\lambda$, as $\lambda^{6/5}$. Therefore the value of the Fried parameter $r_0$ is only meaningful in relation to a specified wavelength. Typically, the wavelength $\lambda$ can be set to 0.5 µm.

Figure 7:
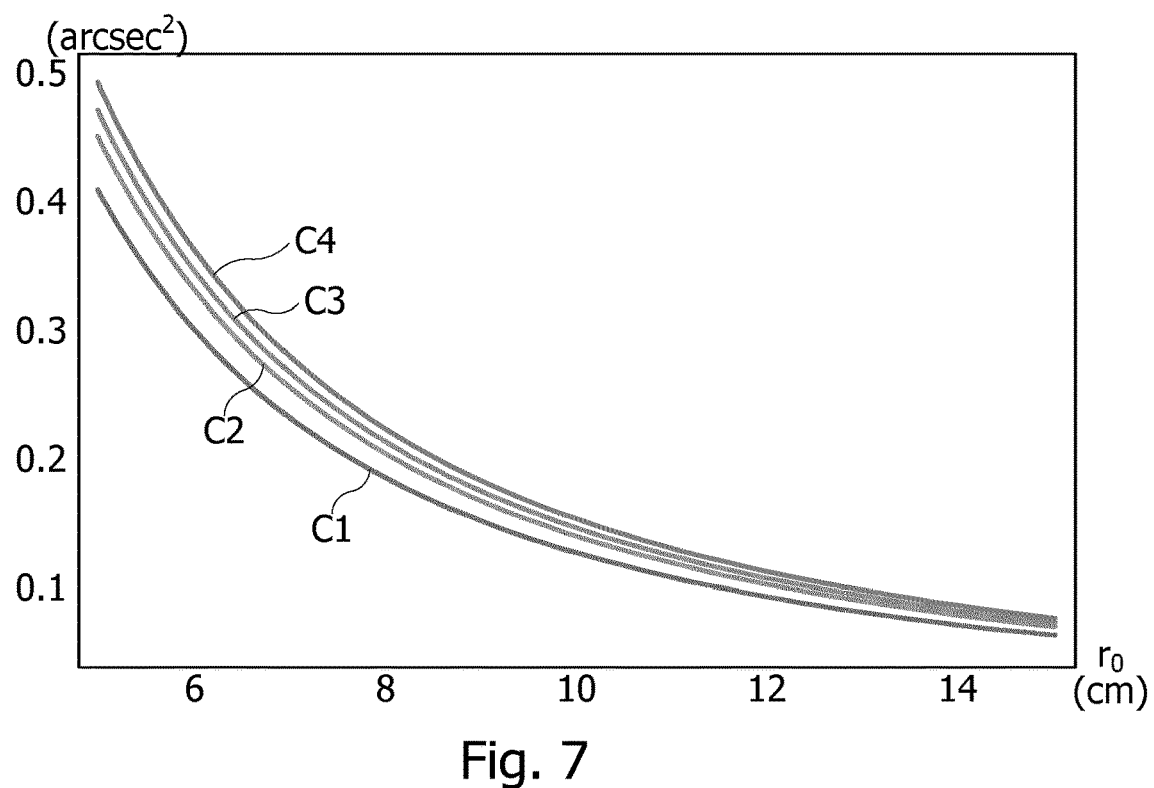
FIG. 7 shows curves of variation of the variance of angle of arrival fluctuations as a function of the Fried parameter, for different values of the outer scale.

In each equation (1) and (2), there are two unknown variables $r_0$ ($r_{0x}$ or $r_{0y}$) and $L_0$. It can be observed from the statistics on all observation sites around the Earth, related to the outer scale $L_0$ that the value of $L_0$ is relatively stable in time and space, around a median value of 20 m. In the following, it is shown that the value of the outer scale $L_0$ has a relatively small impact on the value of the Fried parameter $r_0$. FIG. 7 shows curves C1, C2, C3, C4 of variation of the angle of arrival variance $$\sigma_\alpha^2 \text{ or } \sigma_\beta^2$$

as a function of the Fried parameter $r_0$ when the outer scale $L_0$ is set to 10 m (curve C1), 20 m (curve C2), 30 m (curve C3) and 50 m (curve C4). FIG. 7 shows that the effect of the outer scale $L_0$ fades when the outer scale is greater than 20 m and when the angle of arrival variance corresponds to values of the Fried parameter greater than 10 cm.

Figure 8:
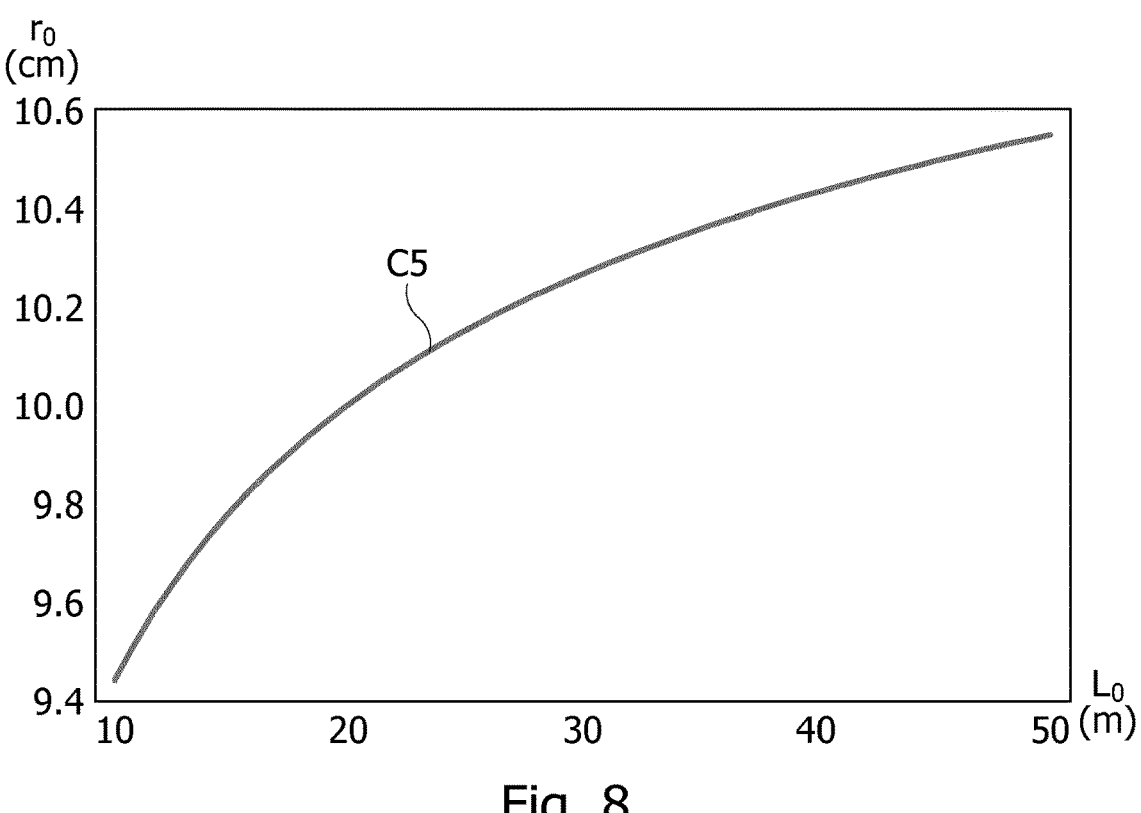
FIG. 8 shows a curve of variation of the estimated Fried parameter as a function of the outer scale.
Figure 9:
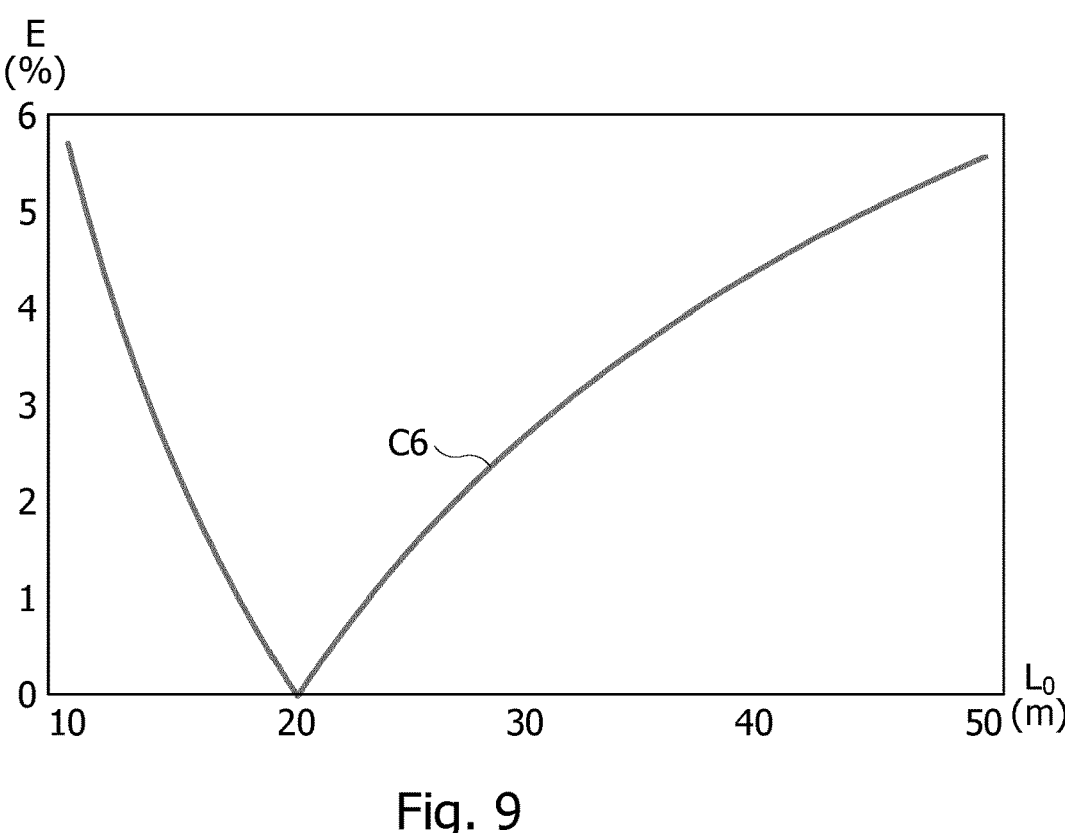
FIG. 9 shows a curve of variation of an estimation error of Fried parameter as a function of the outer scale.

FIG. 8 shows a curve C5 of variation of the Fried parameter $r_0$ as a function of the outer scale $L_0$, when the Fried parameter is estimated using equation (1) or (2) and the outer scale is fixed to 20 m. Curve C5 shows that when the outer scale $L_0$ is set to 20 m, the Fried parameter $r_0$ is equal to about 10 cm. FIG. 9 shows a curve C6 of variation of an estimation error of the Fried parameter $r_0$ as a function of the outer scale $L_0$. FIG. 9 shows that the estimation error stays lower that 5.6% when the outer scale $L_0$ varies between 10 and 50 m, and lower than 2% when the outer scale varies between 15 and 25 m. This error is low since it is lower than statistical and instrumental errors.

In fact, the main error on the estimation of the Fried parameter $r_0$ has a statistical origin related to the finite number of analyzed images. The statistical error on the angle of arrival variance can be computed from the following equation:

$$E_\sigma = \frac{\delta\sigma^2}{\sigma^2} = \sqrt{\frac{2}{N-1}} \qquad (3)$$

wherein $$\sigma^2 = \sigma_\alpha^2 \text{ or } \sigma_\beta^2,$$

and N is the number of images analyzed for the estimation of the Fried parameter $r_0$. The statistical error on the estimation of the Fried parameter can be computed using the following equation:

$$E_{r_0} = \frac{\delta r_0}{r_0} = \frac{3}{5}\sqrt{\frac{2}{N-1}} \qquad (4)$$

When N is fixed to 400 images, $E_\sigma$ reaches 7.1% and $E_{r_0}$ reaches 4.25%.

In addition, the estimation of the Fried parameter $r_0$ is subjected to a scale error. Indeed, the displacements dx and dy are estimated in pixels. Therefore, the variance $$\sigma_\alpha^2 \text{ or } \sigma_\beta^2$$

is multiplied by a factor $k^2$ transforming a variance in pixels squared into an angle variance in square arc seconds or radians. The scale factor k can be measured by observing a double star like Albireo (($\beta$ Cygni), having a known angular separation of 34.6". According to the Shannon criterion with respect to the resolution of the telescope T (=1.22$\lambda$/D), the pixel size should be equal to 0.63". When considering the spreading of the double star on the focal plane of the telescope, the variance error and the error on the Fried parameter due to the error on scale factor k reaches 2.6% and 1.5%, respectively. All the above-considered errors on the Fried parameter $r_0$ reach a total of 5.75%. Other error sources should be considered such as the error due to the finite exposition time in the camera (about 5 ms), and the errors due to noise sources from the sky background and the camera readout. It appears that the cumulated error on the estimation of the Fried parameter $r_0$ is greater than the error resulting from fixing the value of the outer scale $L_0$ to 20 m.

According to an embodiment, the Fried parameter $r_0$ is computed for a zenithal observation. Therefore in the application of equations (1) and (2), the variances $$\sigma_\alpha^2 \text{ or } \sigma_\beta^2$$

are multiplied by cos(z) where z is the angle between the direction of the observed star PS and the zenithal direction at the observation site. The angle z depends on the latitude of the observation site.

Then, the processing card PRC is configured to estimate the seeing parameter $\epsilon_0$, for example using the following equation:

$$\epsilon_0 = 0.98\frac{\lambda}{r_0} \qquad (5)$$

The processing card PRC can also be configured to estimate the isoplanatic angle from the scintillation index of the observed star PS. The scintillation can be determined using the telescope T with the central obstruction CO by measuring the variations of the intensity of the observed star image IPS, and determining the total intensity of the observed star image IPS, the mean and variance of this total intensity on several hundreds of images. The scintillation index is given by the following equation:

$$s = \frac{\sigma_I^2}{\bar{I}^2} \qquad (6)$$

wherein s is the scintillation index, I is the total intensity of the observed star image IPS, $$\sigma_I^2$$

is the variance and $\bar{I}$ is the mean of the total intensity I. Again, the scintillation index s must be defined for the zenithal direction by multiplying it by $(\cos z)^{8/3}$, z being the angle between the zenithal direction and the direction of the observed star PS at the observation site.

Then, the processing card PRC estimates the isoplanatic angle $\theta_0$ by means of the following equation:

$$\theta_0 = (14.87s)^{-3/5} \qquad (7)$$

Figure 10:
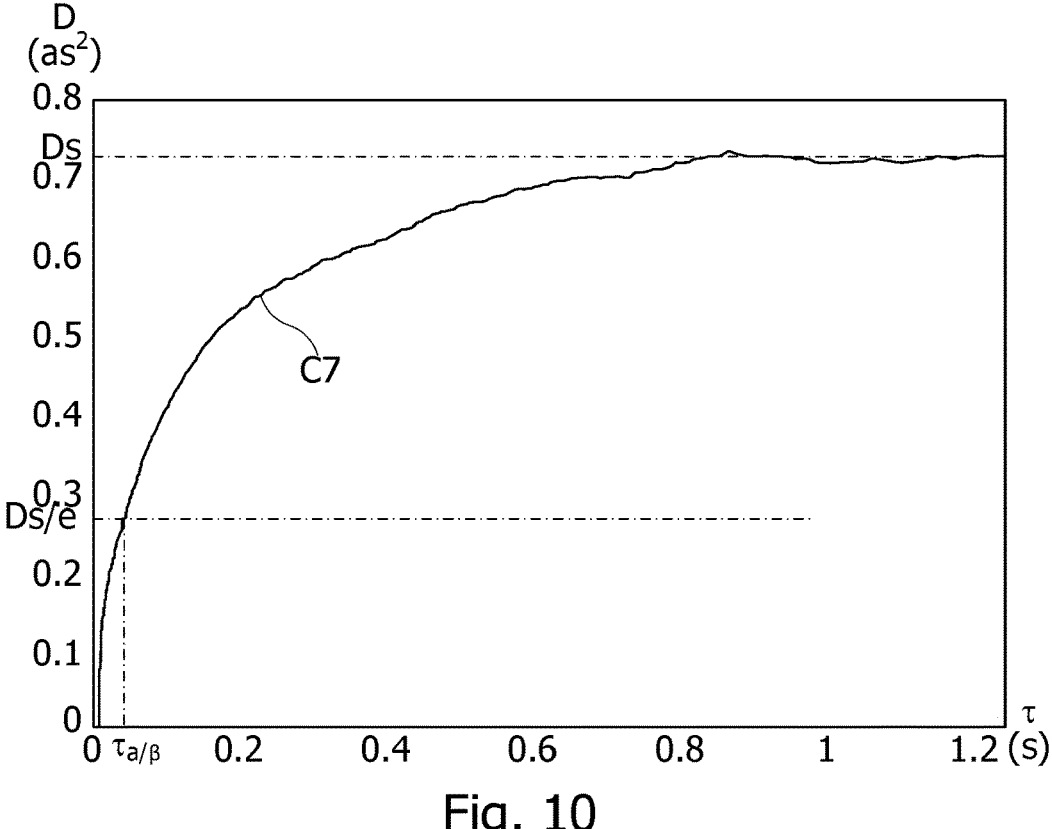
FIG. 10 shows a curve of a temporal structure function of the angle of arrival fluctuations as a function of time delay.

The device 1/2 can also be used to evaluate the coherence time defined by the following equation:

$$\tau_0 = 0.31 \frac{r_0}{v} \qquad (8)$$

wherein $\tau_0$ is the coherence time, and v is the effective speed of the wave front at the ground, the value v of the effective speed being weighted by the energy of the atmospheric turbulence in all layers of the atmosphere. The estimation of the effective speed v is based on the measure of the temporal structure function of the angle of arrival fluctuations, defined by the following equations:

$$D_\alpha(\tau) = \langle [\alpha(t) - \alpha(t + \tau)]^2 \rangle \qquad (9)$$

$$D_\beta(\tau) = \langle [\beta(t) - \beta(t + \tau)]^2 \rangle \qquad (10)$$

wherein $D_\alpha$ and $D_\beta$ are the temporal structure functions of the angle of arrival fluctuations $\alpha$ and $\beta$ respectively, $\langle X \rangle$ represents the average of X and $\alpha(t)$ and $\beta(t)$ are the angle of arrival fluctuations measured at time t. FIG. 10 shows a curve C7 of variation of function $D_\alpha$ (or $D_\beta$) as a function of delay time $\tau$. Function $D_\alpha$ (or $D_\beta$) quickly increases and reaches a saturated value $D_s$ at a short delay time $\tau$, where the correlation between the angle of arrival fluctuations is lost. In the example of FIG. 10, $D_s=0.72$ (arc second)$^2$ reached when the delay time $\tau=0.9$ s. Curve C7 of FIG. 10 also shows that when function $D_{60}$ (or $D_\beta$) reaches the value $D_s/e$ (e=2.71828), corresponding to a value of the delay time $\tau=\tau_\alpha$ or $\tau_\beta$, the angle of arrival fluctuations are coherent with each other. Thus $\tau_\alpha$ or $\tau_\beta$ are called "coherence times" of the angle of arrival fluctuations, respectively in the x and y directions.

In [2], it is theoretically shown that the coherence times $\tau_\alpha$ or $\tau_\beta$ of the angles of arrival fluctuations are linked to the effective speed v of the wave front according to the following equation:

$$v = 10^3 D \left[ G\left( e, \frac{D}{L_0} \right) \right]^{-3} \left( \tau_\alpha^{1/3} + \tau_\beta^{1/3} \right)^{-3} \qquad (11)$$

wherein D (=10 cm) is the telescope aperture diameter, e=2.71828, $\tau_\alpha$ and $\tau_\beta$ are the coherence times of the angles of arrival fluctuations in x and y directions, determined from the value $D_s/e$ of the temporal structure function $D_\alpha$ (or $D_\beta$), and G is a function given by the following equation:

$$G(e, b) = \frac{(1 - e^{-1})[3.001(\pi b)^{1/3} + 1.286((\pi b)^{7/3})] + }{0.411 + 0.188(\pi b)^2} \qquad (12)$$

$$\text{wherein } b = \frac{D}{L_0}.$$

Thus the effective speed v can be deduced by injecting the measures of the coherence times $\tau_\alpha$ and $\tau_\beta$ of the angle of arrival fluctuations, obtained by the device 1/2, in the equation (11) using equation (12), and by setting the outer scale $L_0$ to 20 m (+ or − 10%). Then the effective speed v and the estimated Fried parameter $r_0$ can be used to estimate the coherence time $\tau_0$ using the equation (8).

In the above description, a method is disclosed to determine the parameters characterizing the atmospheric turbulence, including the Fried parameter $r_0$, the seeing parameter $\epsilon_0$, the isoplanatic angle $\theta_0$, and the coherence time $\tau_0$, from the angle of arrival fluctuations $\alpha$ and $\beta$ using the telescope T pointed at the polar star PS.

It should be observed that the telescope T has a diameter D close to the Fried parameter value. Thanks to this choice, the part of the wave front at the telescope aperture is almost coherent and not perturbed. Thus in the focal plane of the telescope T, the observed star PS forms a spot IPS having a position determined by a barycentric method along the two axes x and y in each individual images provided by the camera CM [3].

The parameters characterizing the atmospheric turbulence can also be determined using two points of an extended object observed in the focal plane of the telescope T. In this case, the telescope T within the housing 1 is supported by a motorized mount controlled to compensate the Earth's rotation about its polar rotation axis.

Figure 11:
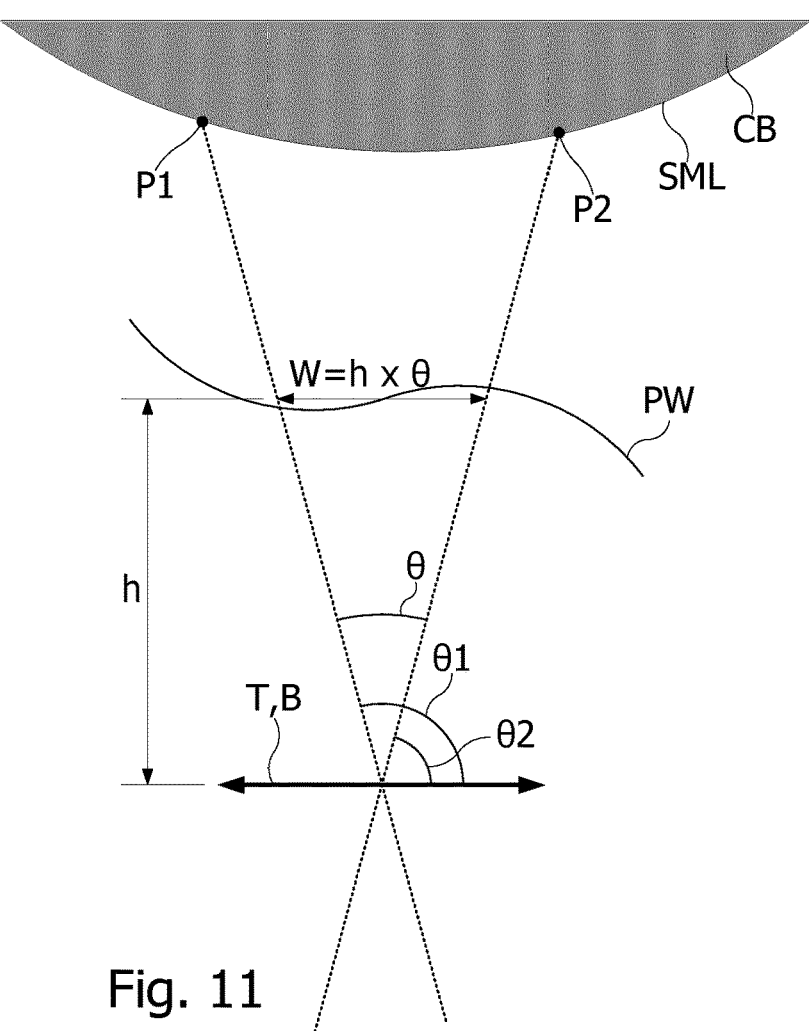
FIG. 11 is an optical scheme showing the Sun or Moon limb and illustrating the transition from an angular correlation to a spatial correlation used in a method for estimating the Fried parameter from the Sun or Moon limb, according to an embodiment.
Figure 12:
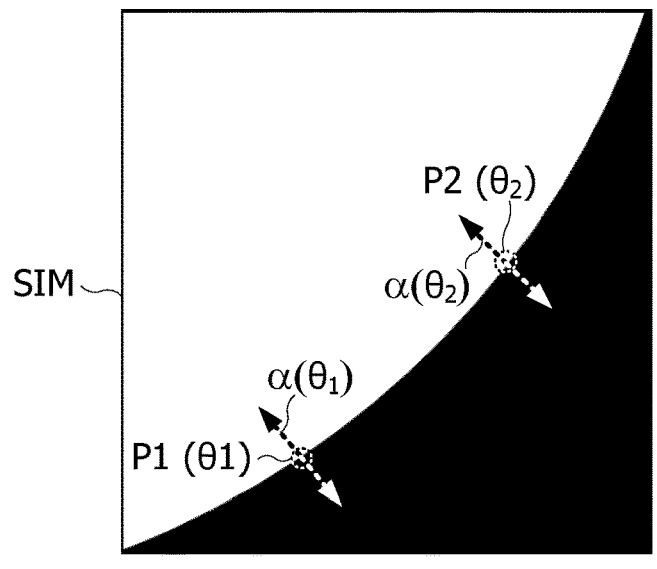
FIG. 12 is a view of the observed Sun or Moon limb, illustrating the estimation method of angle of arrival fluctuations.

FIGS. 11 and 12 illustrate a method for estimating the angle of arrival fluctuations from two distant points P1, P2 spaced apart from each other of the limb of the Sun or the Moon. FIGS. 11 and 12 show points P1 and P2 of the limb viewed by the telescope T under respective angles $\theta_1$ and $\theta_2$, and spaced by an angle separation $\theta=\theta_1-\theta_2$. FIG. 11 further shows a perturbed wavefront PW at the output of a turbulent layer located at an altitude h. The angular separation $\theta$ is related to a spatial distance at the altitude h equal to $\theta$ h. The angular structure function (or mean squared difference) of the angle of arrival fluctuations can be computed using the following equation:

$$D_\alpha(\theta) = \langle[\alpha(\theta_1) - \alpha(\theta_2)]^2\rangle = 2[\sigma_\alpha^2 - C_\alpha(\theta)] \tag{13}$$

wherein $D_\alpha$ and $C_\alpha$ are respectively the angle of arrival structure function and covariance for the angular separation $\theta = \theta_1 - \theta_2$, $\alpha(\theta_1)$ and $\alpha(\theta_2)$ are the angle of arrival fluctuations at angular positions $\theta_1$ and $\theta_2$ in y direction (transverse direction to the limb in the images), $\langle X \rangle$ represents the average of X, and $$\sigma_\alpha^2$$

is the variance of angle of arrival fluctuations in y direction. When passing to a spatial transverse structure function and covariance, equation (13) becomes:

$$D_\alpha(\theta) = \langle[\alpha(r, \theta_1) - \alpha(r, \theta_2)]^2\rangle \tag{14}$$

$$= \langle[\alpha(r, \theta_1) - \alpha(r - \theta h, \theta_1)]^2\rangle = D_{\alpha,s}(\theta h)$$

wherein $D_{\alpha,s}(\theta h)$ is the spatial structure function in the transverse direction with respect to the observed limb of the Sun or Moon. In [3], it is shown that the spatial transverse structure function $D_{\alpha,s}(\theta h)$ can be computed using the following equation:

$$D_{\alpha,s}(\theta \bar{h}) \simeq 0.364\lambda^2 r_0^{-5/3} D^{-1/3}\left[1 - 0.798\left(\frac{\theta \bar{h}}{D}\right)^{-1/3}\right] \tag{15}$$

wherein $\bar{h}$ is the equivalent altitude of the whole atmospheric turbulence given by the following equation:

$$\bar{h} = \left[\frac{\int_0^\infty C_n^2(h)h^{-5/3}\,dh}{\int_0^\infty C_n^2(h)\,dh}\right]^{-3/5} \tag{16}$$

wherein $$C_n^2(h)$$

is refractive index structure constant which corresponds to the atmospheric turbulence strength at the altitude h.

The measurements according to FIG. 12 make it possible to estimate the spatial transverse structure functions $D_{\alpha,s}(\theta_a h)$ and $D_{\alpha,s}(\theta_b h)$ for two angular separations $\theta_a = \theta_{a1} - \theta_{a2}$ and $\theta_b = \theta_{b1} - \theta_{b2}$, where $(\theta_{a1}, \theta_{a2})$ and $(\theta_{b1}, \theta_{b2})$ are two pairs of angular positions on the observed Sun or Moon limb. Then $\bar{h}$ is deduced from a ratio $R_h$ of structure functions $D_{\alpha,s}(\theta_a h)$ and $D_{\alpha,s}(\theta_b h)$, the ratio $R_h$ being linked to h as followed:

$$R_h = \frac{D_{\alpha,s}(\theta_a \bar{h})}{D_{\alpha,s}(\theta_b \bar{h})} \simeq \frac{D^{-1/3} - 0.798(\theta_a \bar{h})^{-1/3}}{D^{-1/3} - 0.798(\theta_b \bar{h})^{-1/3}} \tag{17}$$

Equation (17) makes it possible to determine the equivalent altitude $\bar{h}$ which can be used in equation (15) to determine the Fried parameter $r_0$ as a function of the angle separation $\theta(=\theta_a$ or $\theta_b)$. The use of both values of the angle separations $\theta_a$, $\theta_b$, provides two estimated values $r_{0a}$, $r_{0b}$ of the Fried parameter $r_0$, each corresponding to one of the two angular separations $\theta_a$ and $\theta_b$. Then the Fried parameter $r_0$ can be fixed to an average value of $r_{0a}$, $r_{0b}$.

According to an embodiment, other pairs of angular positions of points on the observed Sun or Moon limb can be used to compute a number of values of $\bar{h}$, from which estimated values of the Fried parameter $r_0$ are deduced, the Fried parameter $r_0$ being set to a median value of all the estimated values, to exclude outliers.

The isoplanatic angle $\theta_0$ can be computed from the following equation:

$$\theta_0 = 0.314\frac{r_0}{\bar{h}} \tag{18}$$

The other parameters, $\epsilon_0$ and $\tau_0$, can be computed from the Fried parameter as explained above, from equations (5) and (8).

Therefore, the above-disclosed method using the device 1 can characterize the atmospheric turbulence conditions both during the day and night, and everywhere over the world, even from the south hemisphere.

The above description of various embodiments of the present invention is provided for purposes of description to one of ordinary skill in the related art. It is not intended to be exhaustive or to limit the invention to a single disclosed embodiment. Numerous alternatives and variations to the present invention will be apparent to those skilled in the art of the above teaching. Accordingly, while some alternative embodiments have been discussed specifically, other embodiments will be apparent or relatively easily developed by those of ordinary skill in the art.

In this respect, it is apparent to a person skilled in the art that all or a part of the operations performed by the processing card PRC can be performed by a computer CP connected to the processing card, the images acquired by the camera CM, or only the displacements dx, dy, or the angle of arrival fluctuations $\alpha$ and $\beta$ or the variances $$\sigma_\alpha^2 \text{ and } \sigma_\beta^2$$

computed from the angle of arrival fluctuations, being transmitted to the computer CP.

In some implementations, the method for characterizing the atmospheric turbulence only estimates the Fried parameter $r_0$ or some other of the above-disclosed parameters. When the coherence time $\tau_0$ does not need to be estimated, the image rate of the camera can be as low as 50 images/s. When the scintillation s or the isoplanatic angle $\theta_0$ does not need to be determined, the obstruction CO is not necessary. In this case, the telescope diameter can be reduced up to 4 to 6 cm.

The above description is intended to embrace all alternatives, modifications and variations of the present invention that have been discussed herein, and other embodiments that fall within the spirit and scope of the above description. Limitations in the claims should be interpreted broadly based on the language used in the claims, and such limitations should not be limited to specific examples described herein.

CITED REFERENCES

[1] "Experimental estimation of the spatial-coherence outer scale from a wavefront statistical analysis", A. Ziad, J. Borgnino, F. Martin and A. Agabi, Astronomy & Astrophysics, 282 (1994), pp. 1021-1033.
[2] "Temporal characterization of atmospheric turbulence with the GSM instrument", A. Ziad, J. Borgnino, W. Dali Ali, A. Berdja, J. Maire and F. Martin, Journal of Optics: Pure & Applied Optics, 14, 045705-8pp, (2012)
[3] "The Generalised Differential Image Motion Monitor", E. Aristidi, A. Ziad, J. Chabé, Y. Fantëi-Caujolle, C. Renaud, C. Giordano, Monthly Notices of the Royal Astronomical Society, Vol. 486, Issue 1, p. 915-925 (2019)

The invention claimed is:

1. A method for characterizing atmospheric turbulence comprising:

acquiring images (SIM) of a celestial object (PS, CB) by means of a camera (CM) of CCD (Charge-Coupled Device) type, said camera (CM) is coupled to a telescope (T) of Cassegrain type, and a Barlow lens (B) is inserted between the telescope (T) and the camera (CM) to extend the focal length of the telescope T; said images (SIM) acquired by the camera (CM) are received and processed by a processing card being (PRC) arranged for:

analyzing the acquired images to determine a time series of an angle of arrival fluctuations of wavefronts in x and y directions from positions of at least one spot (IPS, P1, P2) formed by the celestial object in the acquired images;

determining variances of the angle of arrival fluctuations; and estimating the atmospheric turbulence by determining a Fried parameter ($r_0$), from the variances of the angle of arrival fluctuations, by setting an outer scale parameter ($L_0$) of the atmospheric turbulence to a fixed median value of 20 m plus or minus 10%, wherein the at least one spot is formed by Polaris to which the telescope is rigidly pointed.

2. The method of claim 1, wherein the telescope (T) is rigidly secured to a fixed support in a direction toward Polaris.

3. The method of claim 2, wherein the Fried parameter is estimated from the following equation:

$$\sigma^2 = 0.18\lambda^2 r_0^{-1/3}\left(D^{-1/3} - 1.525L_0^{-1/3}\right)$$

wherein $\sigma^2$ is the variance of the angle of arrival fluctuations, $\lambda$ is the wavelength of the light emitted by Polaris, $r_0$ is the Fried parameter, D is an aperture diameter of the telescope (T), and $L_0$ is the outer scale parameter.

4. The method of claim 1, wherein the acquired images are analyzed in a limited region around analyzed points (IPS, P1, P2) formed by Polaris.

5. The method of claim 1, wherein the variance of the angle of arrival fluctuations is multiplied by cos(z), z being an angle between the direction of Polaris and the zenithal direction, at an observation site where the images are acquired.

6. The method of claim 1, wherein the images are acquired by the camera (CM) at an image rate of 50 to 200 images/s.

7. A device configured to implement the method of claim 1, to analyze images (SIM) acquired by the camera (CM) of the CCD (Charge-Coupled Device) type coupled to the telescope (T) of the Cassegrain type pointed at Polaris.

8. The device of claim 7, comprising the camera (CM) coupled to the telescope (T), and the processing card (PRC) receiving and processing images acquired by the camera.

9. The device of claim 8, wherein the telescope (T) has at least one of the following features:

it has an aperture diameter set to a value between 4 and 12 cm, the Barlow lens (B) interfaces with the camera (CM) to increase the focal length (F) of the telescope.

10. A non-transitory computer-readable storage medium storing a program that, when executed by a computer, causes said computer to perform said method according to claim 1, to analyze images (SIM) acquired by the camera (CM) coupled to the telescope (T) pointed at Polaris.

11. The device of claim 7, wherein an optical path passes through the telescope (T) and the Barlow lens (B) to an image sensor (IS) of the camera (CM).

12. A method for characterizing atmospheric turbulence comprising:

acquiring images of a celestial object by means of a camera coupled to a telescope; said images (SIM) acquired by a camera (CM) of CCD (Charge-Coupled Device) type, said camera is couple to a telescope (T) of Cassegrain type, and a Barlow lens (B) is inserted between the telescope (T) and the camera (CM) to extend the focal length of the telescope (T); said images (SIM) acquired by the camera (CM) are received and processed by a processing card (PRC) being arranged for:

analyzing the acquired images to determine a time series of an angle of arrival fluctuations of wavefronts in x and y directions from positions of at least one spot formed by the celestial object in the acquired images;

determining variances of the angle of arrival fluctuations; and estimating the atmospheric turbulence by determining a Fried parameter ($r_0$), from the variances of the angle of arrival fluctuations, by setting an outer scale parameter ($L_0$) of the atmospheric turbulence to a fixed median value of 20 m plus or minus 10%, wherein the at least one spot is formed by Polaris to which the telescope is rigidly pointed.

13. The method of claim 12, wherein the telescope (T) is fixed on a mount and oriented towards the Moon or Sun limb (SML), the mount being motorized and controlled to compensate rotation of the Earth about its rotation axis, and the method further comprises:

analyzing the acquired images to determine the angle of arrival fluctuations of light positions of two spots (P1, P2) spaced apart from each other on the Moon or Sun limb.

14. The method of claim 13, wherein the Fried parameter is estimated from the following equation:

$$D\alpha, s(\theta \ h^-) = 0.3 \ 6 \ 4 \ \lambda 2 \ r0 - 5/3 \ D - 1/3[1 - 0.7 \ 9 \ 8 \ (\theta \ h^- D) - 1/3] \quad 5$$

wherein h is the equivalent altitude of the whole atmospheric turbulence, $\lambda$ is the wavelength of the light emitted by the observed limb, $r_0$ is the Fried parameter, D is an aperture diameter of the telescope (T), $\theta$ is an angular separation between two viewing angles $\theta_1$ and $\theta_2$ of considered points (P1, P2) of the observed limb (SML), $\alpha(\theta_1)$ and $\alpha(\theta_2)$ are angle of arrival fluctuations at the two considered points, and $D_{\alpha,s}(\theta h)$ is a spatial structure function of angle of arrival fluctuations $\alpha$ for the angular separation $\theta$.

15. The method of claim 14, wherein the equivalent altitude h of the whole atmospheric turbulence is deduced from the following equation:

$$D\alpha, s(\theta a \ h^-)D\alpha,$$

$$s(\theta b \ h^-) \simeq D - 1/3 - 0.798(\theta a \ h^-) - 1/3 D - 1/3 - 0.798(\theta b \ h^-) - 1/3 \quad 25$$

wherein $\theta_a$ and $\theta_b$ are angular separations of two considered pairs of points (P1, P2) on the observed limb (SML), and $D_{\alpha,s}(\theta_a h)$ and $D_{\alpha,s}(\theta_b h)$ are values of the spatial structure function $(D_{\alpha,s})$ of angle of arrival fluctuations for the two angular separations $\theta_a$ and $\theta_b$.

\* \* \* \* \*